US011886385B2

(12) United States Patent
Goyal et al.

(10) Patent No.: US 11,886,385 B2
(45) Date of Patent: Jan. 30, 2024

(54) SCALABLE IDENTIFICATION OF DUPLICATE DATASETS IN HETEROGENEOUS DATASETS

(71) Applicant: INTERNATIONAL BUSINESS MACHINES CORPORATION, Armonk, NY (US)

(72) Inventors: Praduemn K. Goyal, Holmdel, NJ (US); Sandeep Hans, New Delhi (IN); Samiulla Zakir Hussain Shaikh, Bangalore (IN); Diptikalyan Saha, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 17/805,134

(22) Filed: Jun. 2, 2022

(65) Prior Publication Data
US 2023/0394011 A1 Dec. 7, 2023

(51) Int. Cl.
*G06F 16/174* (2019.01)
*G06F 16/14* (2019.01)
(Continued)

(52) U.S. Cl.
CPC ........ *G06F 16/1748* (2019.01); *G06F 16/148* (2019.01); *G06F 16/162* (2019.01); *G06F 18/22* (2023.01)

(58) Field of Classification Search
CPC .................. G06F 16/1748; G06F 16/162
See application file for complete search history.

(56) References Cited

U.S. PATENT DOCUMENTS 6,662,184 B1 12/2003 Friedberg
6,922,700 B1 * 7/2005 Aggarwal ........... G06F 16/2228
707/999.102
(Continued)

OTHER PUBLICATIONS

Das Sarma, et al., "Finding Related Tables", Proceedings of the 2012 ACM SIGMOD International Conference on Management of Data, May 20-24, 2012, pp. 16 Pages.
(Continued)

*Primary Examiner* — Baoquoc N To
(74) *Attorney, Agent, or Firm* — Daniel G. DeLuca

(57) ABSTRACT

An embodiment for identifying and sorting duplicate datasets within a large pool of heterogeneous datasets may include received a plurality of heterogeneous datasets. The embodiment may automatically compare schema information and metadata within each of the received plurality of heterogeneous datasets to generate name-based similarity scores for each dataset. The embodiment may also automatically compare data distribution information within each of the received plurality of heterogeneous datasets to generate a plurality of data distribution similarity scores for each heterogeneous dataset. The embodiment may further include automatically calculating an overall distance metric using the name-based similarity scores and plurality of data distribution similarity scores. The embodiment may also include based on the calculate overall distance metric, automatically generating distance graphs that identifying clusters of similar datasets and illustrate inferred lineage for the clusters of similar datasets.

20 Claims, 7 Drawing Sheets

(51) Int. Cl.
*G06F 16/16* (2019.01)
*G06F 18/22* (2023.01)

(56) References Cited

U.S. PATENT DOCUMENTS

| | | |
|---|---|---|
| 7,725,454 B2 | 5/2010 | Kamani |
| 7,849,065 B2 | 12/2010 | Kamani |
| 2012/0095993 A1 | 4/2012 | Shau |
| 2016/0092557 A1 | 3/2016 | Stojanovic |
| 2019/0095472 A1 | 3/2019 | Griffith |
| 2019/0138538 A1 | 5/2019 | Stojanovic |
| 2019/0384571 A1 | 12/2019 | Oberbreckling |
| 2021/0365344 A1 | 11/2021 | Bui |

OTHER PUBLICATIONS

Mell et al., "The NIST Definition of Cloud Computing", Recommendations of the National Institute of Standards and Technology, NIST Special Publication 800-145, Sep. 2011, 7 pages.

Ontanon, "An overview of distance and similarity functions for structured data", Google Research, Artificial Intelligence Review, Feb. 18, 2020, 51 Pages. https://arxiv.org/pdf/2002.07420.

* cited by examiner

SCALABLE IDENTIFICATION OF DUPLICATE DATASETS IN HETEROGENEOUS DATASETS

BACKGROUND

The present application relates generally to the field of data processing, and more particularly, to a system for identifying and sorting duplicate datasets within a large pool of heterogeneous datasets.

Many organizations maintain large amounts of different types of data, such as, for example, customer data, inventory data, or the like. Having accurate, high-quality data is often of significant importance. Over time, many organizations create a large amount of unwanted duplicate datasets. Organizations would benefit greatly from having the ability to identify and sort duplicate datasets within large pools of heterogeneous datasets.

SUMMARY

According to one embodiment, a method, computer system, and computer program product for identifying and sorting duplicate datasets within a large pool of heterogeneous datasets is provided. The embodiment may include receiving a plurality of heterogeneous datasets. The embodiment may also include automatically comparing schema information and metadata within each of the received plurality of heterogeneous datasets to generate name-based similarity scores for each combination of datasets. The embodiment may also include automatically pruning the plurality of heterogeneous datasets by removing datasets having no similarities. The embodiment may further include automatically identifying clusters of similar datasets using the name-based similarity scores for each dataset and generating mapping graphs illustrating each cluster of similar datasets. The embodiment may also include automatically comparing data distribution information within each of the received plurality of heterogeneous datasets to generate a plurality of data distribution similarity scores for each heterogeneous dataset. The embodiment may further include automatically calculating an overall distance metric using the name-based similarity scores and plurality of data distribution similarity scores. The embodiment may also include, based on the calculate overall distance metric, automatically generating distance graphs that identify clusters of similar datasets and illustrate inferred lineage for the clusters of similar datasets.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
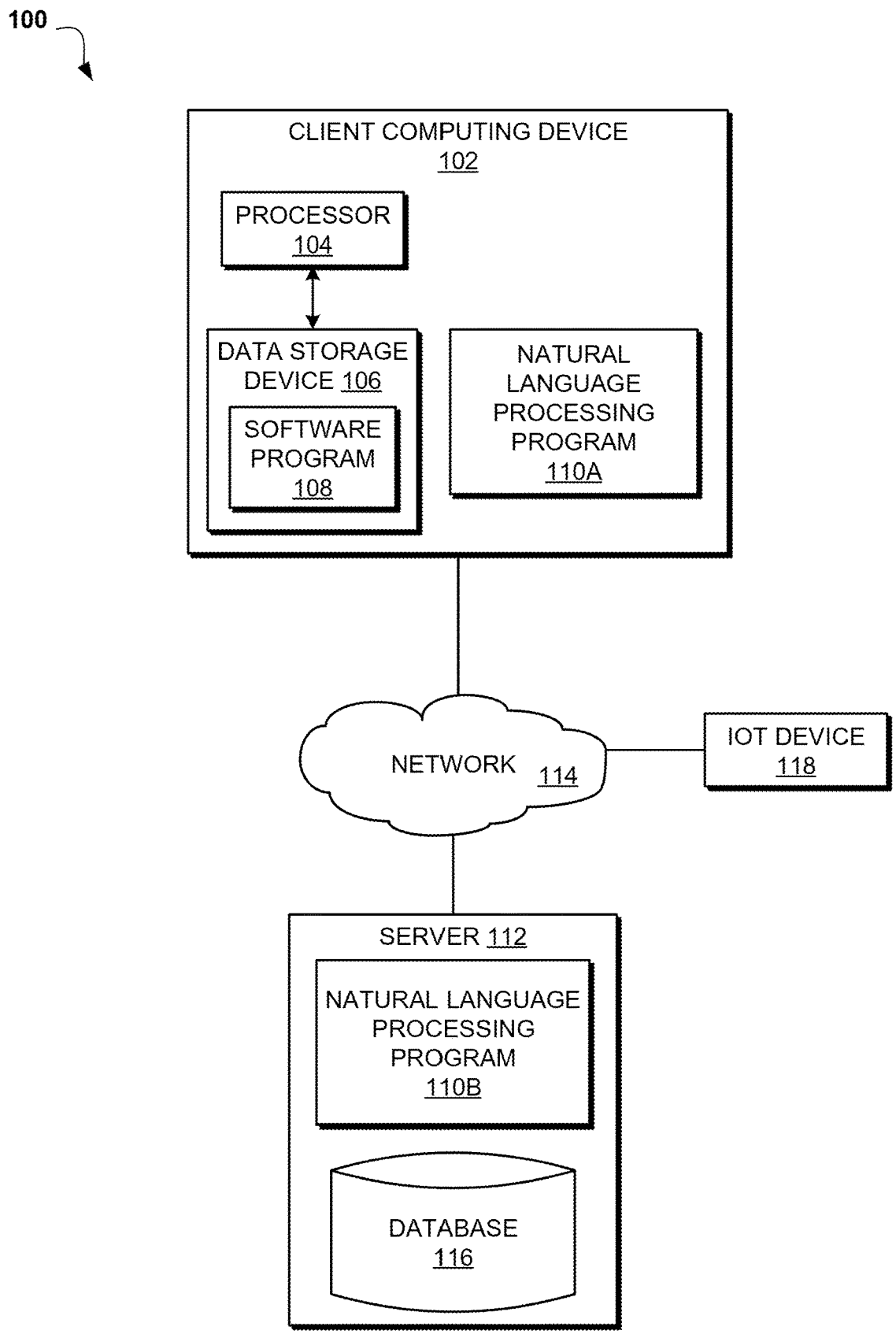
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to the field of data processing, and more particularly, to a system for identifying and sorting duplicate datasets within a large pool of heterogeneous datasets. The following described exemplary embodiments provide a system, method, and program product to, among other things, receive heterogeneous datasets, automatically compare the schema information and metadata within each of the received plurality of heterogeneous datasets to generate name-based similarity scores for each dataset, automatically compare data distribution information within each of the received plurality of heterogeneous datasets to generate a plurality of data distribution similarity scores for each heterogeneous dataset, and then automatically calculate an overall distance metric using the name-based similarity scores and plurality of data distribution similarity scores to identify clusters of similar datasets for generating distance graphs using the calculated overall distance metric to illustrate inferred lineage. Therefore, the present embodiment has the capacity to improve the managing and sorting of datasets by allowing users to not only identify duplicates using metadata information, but to also utilize data distribution information to infer lineage and provenance of related datasets.

As previously described, many organizations maintain large amounts of different types of data, such as, for example, customer data, inventory data, or the like. Having accurate, high-quality data is often of significant importance. Over time, organizations create a large amount of unwanted duplicate datasets. Large amounts of duplicate datasets lead to undesirable increases in maintenance costs and movement costs. Many organizations analyze metadata to identify duplicate datasets. However, many datasets are heterogeneous in nature. Heterogeneous datasets include any datasets having a high variability of data types and formats. In the context of this disclosure, heterogeneous datasets may include not only categorical or name-based information, but also numerical information. Illustrative embodiments described herein utilize a scalable and comprehensive approach that utilizes both the metadata and naming information, as well as the content of the data stored within each dataset (the data distribution information) to not only identify duplicates, but to also illustrate inferred lineage and provenance of a plurality of heterogeneous datasets.

According to at least one embodiment, when a user inputs a plurality of heterogeneous datasets into a computer system capable of employing methods in accordance with the present invention, the method, system, computer program product may automatically compare schema information and metadata within each of the received plurality of heterogeneous datasets to generate name-based similarity scores for each dataset. The method, system, computer program product may then automatically prune the plurality of heterogeneous datasets by removing datasets having no similarities. Next, the method, system, computer program product may automatically identify clusters of similar datasets using the name-based similarity scores for each dataset and generate mapping graphs illustrating each cluster of similar datasets. According to one embodiment, the method, system, computer program product may then automatically compare data distribution information within each of the received plurality of heterogeneous datasets to generate a plurality of data distribution similarity scores for each heterogeneous dataset. Next, the method, system, computer program product may automatically calculate an overall distance metric using the name-based similarity scores and plurality of data distribution similarity scores. The method, system, computer program product may then, based on the calculate overall distance metric, automatically generate distance graphs that identify clusters of similar datasets and illustrate inferred lineage for the clusters of similar datasets. In turn, the method, system, computer program product has used both metadata and naming information as well as data distribution information to identify duplicate datasets present in a plurality of heterogeneous datasets and generate inferred lineage data that a user may use to more easily manage or sort the datasets.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify and sorting duplicate datasets within a large pool of heterogeneous datasets.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a data processing program 110A and communicate with the server 112 and IoT Device 118 via the communication network 114, in accordance with one embodiment of the present disclosure. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a data processing program 110B and a database 116 and communicating with the client computing device 102 and IoT Device 118 via the communication network 114, in accordance with embodiments of the present disclosure. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, a voice-controlled personal assistant, and/or any other IoT Device 118 known in the art for receiving queries that is capable of connecting to the communication network 114, and transmitting and receiving data with the client computing device 102 and the server 112.

According to the present embodiment, the data processing program 110A,110B may be a program capable of receiving a plurality of heterogeneous datasets. Data processing program 110A,110B may then compare schema information and metadata within each of the received plurality of heterogeneous datasets to generate name-based similarity scores for each dataset. Next, data processing program 110A,110B may then automatically prune the plurality of heterogeneous datasets by removing datasets having no similarities. Data processing program 110A,110B may then automatically identify clusters of similar datasets using the name-based similarity scores for each dataset and generate mapping graphs illustrating each cluster of similar datasets. Next, data processing program 110A,110B may automatically compare data distribution information within each of the received plurality of heterogeneous datasets to generate a plurality of data distribution similarity scores for each heterogeneous dataset. Next, data processing program 110A, 110B automatically calculate an overall distance metric using the name-based similarity scores and plurality of data distribution similarity scores. Finally, data processing program 110A,110B based on the calculate overall distance metric, may automatically generate distance graphs that identify clusters of similar datasets and illustrate inferred lineage for the clusters of similar datasets. In turn, data processing program 110A,110B used both metadata and naming information, as well as data distribution information, to identify duplicate datasets present in a plurality of heterogeneous datasets and generate inferred lineage data that a user may use to more easily manage or sort the datasets.

Figure 2:
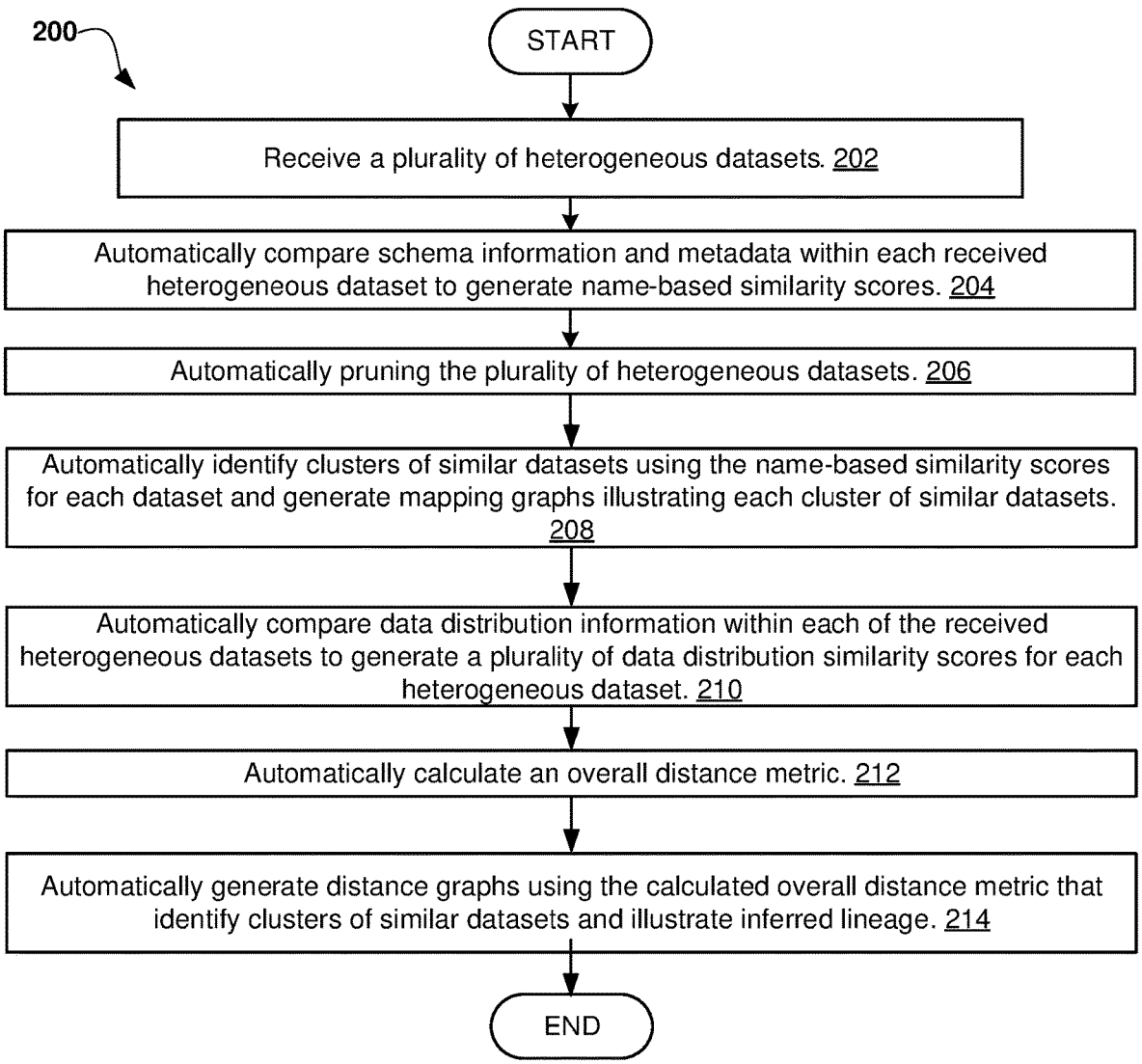
FIG. 2 illustrates an operational flowchart for identifying duplicate datasets within a large pool of heterogeneous datasets according to at least one embodiment.

Referring now to FIG. 2, an operational flowchart depicting a data processing process 200 for identifying and sorting duplicate datasets within a large pool of heterogeneous datasets according to at least one embodiment is provided. At 202, the data processing program 110A,110B receives a plurality of heterogeneous datasets. Datasets may include any types of stored data in the form of a database tables, documents, or files. In embodiments, the received heterogeneous datasets may be contained in large data lakes of several petabytes or more. Heterogeneous datasets include not only metadata and naming information, such as table names, field names, and types, but also include numerical information, referred to herein as data distribution information.

At 204, the data processing program 110A,110B 110A, 110B automatically compares schema information and metadata within each of the received plurality of heterogeneous datasets to generate name-based similarity scores for each dataset. In the context of this disclosure, name-based similarity scores are any similarity scores generated by data processing program 110A,110B from processing schema information and metadata of a plurality of received heterogeneous datasets. Metadata may include any information related to a dataset that is not the content of the data itself, including but not limited to, file name, file size, date of creation, data purpose, time of creation, author or creator of the data, location of the computer network where the data was created, standards used, data quality, source of the data, and the process used to create the data. The schema information may include, in a non-limiting example, information such as table name, fields, data types, column names, and the relationships between these entities, or any other suitable schema information that a user may want to use to help inform an accurate similarity score for a given dataset.

For example, if data processing program 110A,110B is comparing two heterogeneous datasets having Table 1 and Table 2 respectively, data processing program 110A,110B will compare a Column 1 of Table 1 including Token 1, Token 2, and Token 3, with a Column 2 of Table 2 including Token 1, Token 2, and Token 3. Data processing program 110A,110B may compare the various schema information, in this case column name and tokens, using prefix matching, semantic relatedness, abbreviations, acronyms, and any other suitable information useful in determining a similarity score. Data processing program may determine similarity scores based on a scale between 0 and 1.0. If data processing program 110A,110B determines that Column 1 and Column 2 have column names that match exactly, it will generate a perfect similarity score of 1.0 indicating that those column names are the same and potentially part of a duplicate dataset. However, if Column 1 has the column name "hoursper" and Column 2 has the column name "hoursperweek", data processing program 110A,110B may only generate a similarity score of 0.83333. In the same example, Table 1 may include a token "employee id", while Table 2 may include a token "emp.id". Data processing program 110A, 110B may determine, for example, that "emp.id" includes an abbreviation "emp" for the word employee, or alternatively that the prefixes of each token match. Again, data processing program 110A,110B generates a similarity score that is less than 1.0, as Token 1 and Token 2 are not identical, but that is also greater than 0, as Token 1 and Token 2 may indicate very similar stored data. Data processing program 110A, 110B may make a comprehensive determination of similarity between Table 1 and Table 2 by comparing each column name and each token contained in Table 1 with each column name and token contained in Table 2.

Next, at 206, data processing program automatically prunes the plurality of received heterogeneous datasets. Pruning is typically a data compression technique that reduces the size of decision trees by removing sections of the tree that are non-critical and redundant to classify instances. In the context of this disclosure, pruning relates to eliminating certain tables that are unrelated or dissimilar from each other from further processing or consideration. Because data processing program 110A,110B determines similarities of datasets using both the metadata and schema information, as well as the numerical data distribution information, data processing program 110A,110B includes a number of built-in tools to help manage the amount of data being processed and the amount of output it generates. At 206, data processing program 110A,110B "prunes" the datasets by limiting comparison of those datasets which contain no connection or similarity. This step is important for increasing accuracy and speed of data processing program 110A,110B when the similarity scores are later used to calculate an overall distance metric at 212. Further discussion of how data processing program 110A,110B allows for a scalable mechanism for identifying duplicates and generating inferred lineage in a high-volume setting is discussed more in connection with FIG. 3 below.

Next at 208, data processing program 110A,110B automatically identifies clusters of similar datasets using the name-based similarity scores for each dataset and generates mapping graphs illustrating each cluster of similar datasets. Data processing program 110A,110B may identify clusters of similar datasets using the name-based similarity scores by detecting related tables that meet a minimum threshold for name-based similarity scores between each table. For example, data processing program 110A,110B may be designed to consider any first Table 1 and second Table 2 having average name-based similarity scores of greater than or equal to 0.9 to be similar enough to be put into a cluster of similar datasets. The generated mapping graphs of clusters of similar datasets in this step are preliminary in nature, and are further modified as data processing program 110A, 110B further processes the received heterogeneous datasets in connection with the steps described below.

At 210, data processing program 110A,110B automatically compares data distribution information within each of the received plurality of heterogeneous datasets to generate a plurality of data distribution similarity scores for each heterogeneous dataset. In this step, data processing program 110A,110B generates similarity scores based on the content of the data itself. Data processing program 110A,110B may be configured to compare various types of data types. For example, if two tables contain numeric information, such as, for example, salaries, data processing program 110A,110B may generate a distribution curve containing all of the different salaries in each table and compare the areas under the distribution curve to generate a similarity score. If two tables contain categorical information, such as "Employment Type" where the content of the data includes a limited number of responses, for example, "Employed", "Unemployed", or "Part-time", data processing program 110A, 110B may compare cosine similarity of frequency vectors to generate a similarity score. Data processing program 110A, 110B may further be configured to process text data using pattern similarity comparisons, or date data using a temporal distribution curve. Data processing program 110A,110B may be further configured to process and compare any known data content types. In embodiments, data processing program 110A,110B automatically generates constraints for each database being processed to utilize minimal constraints in generating a similarity score. Data processing program 110A,110B may be configured to process any known datatype in any desired language, such as, for example, SQL. As described above, data processing program 110A,110B may then generate similarity scores based on a scale between 0 and 1 based on the comparisons of the data distribution information from each table being compared.

Next, at 212, data processing program 110A,110B automatically calculates an overall distance metric using the name-based similarity scores and plurality of data distribution similarity scores. Data processing program 110A,110B calculates this overall distance metric by adding each name-based similarity score and each data-distribution similarity score to form a comprehensive relatedness or similarity score in the form of a distance metric. For example, in embodiments, data processing program 110A,110B make calculate an overall distance metric using the following formula: Final relatedness score $\text{sim}(T1, T2) = \alpha*T + \beta*N + \gamma*C + \delta*S + \varepsilon*D$ where T1 and T2 are Table 1 and Table 2 respectively. Each of T, N, C, S, and D, represent factors described above for different types of name-based or data distribution factors. N represents the common area under a distribution curve for numeric columns, S represents pattern similarity for string columns, C represents cosine similarity of frequency distributions for categorical columns, D represents common area under temporal distribution for the Data type columns, and T represents column-name based similarity among two tables. Lastly, $\alpha$, $\beta$, $\gamma$, $\delta$, and $\varepsilon$ are values for individually weighting each factor. In the formula above, $\alpha + \beta + \gamma + \delta + \varepsilon = 1$, and $0 \leq T, N, C, S, D \leq 1$. Accordingly, one of ordinary skill in the art could afford different values to $\alpha$, $\beta$, $\gamma$, $\delta$, and $\varepsilon$ to assign different weights to different factors depending on the domain and application requirements.

It should be noted that data processing program 110A, 110B generates a large amount of outputs and information in performing the steps described in relation to data processing process 200. Attempts to process high volumes of datasets using the methods described above generally leads to large amounts of outputs that are either too large to store in memory, or would result in a process that takes too long to store and would have less than ideal accuracy. However, data processing program 110A,110B is configured to engage in high volume distribution generation using a specific process 300 illustrated in FIG. 3A to ensure that the data processing process 200 is scalable as the steps of the process are carried out. Typically, scalability is at issue when the data distribution data is being processed, as numerical data typically contains high volumes of various data entries. Process 300 will be described in detail below.

First, at 302, data processing program 110A,110B may identify minimum and maximum ranges for a given dataset. For example, a table may include data for employee's salaries. Data processing program 110A,110B may identify that the minimum and maximum ranges for employee salaries spans from 50,000 dollars to 100,000 dollars.

Next at 304 data processing program 110A, 110B may divide the identified ranges into smaller rangers. For example, using the same example above referring to employee's salaries, data processing program 110A,110B may divide the range of 50,000 to 100,000 dollars into a smaller 'K' number of equal ranges, where K=5.

At 306, data processing program 110A,110B may issue queries in each smaller range to obtain results with information for each smaller range. Using the same example as above, data processing program 110A,110B may issue queries in the range of 50,000 to 60,000 dollars to obtain information about data entries in that smaller range.

Lastly, at 308, data processing program 110A,110B may merge the results to generate an overall distribution based on the results from each smaller range. In the example above, data processing program 110A,110B may merge the results from each of the 5 smaller salary ranges to generate an overall distribution. Accordingly, the final number of outputs and data is significantly less than the sum of the total data processed, allowing data processing program 110A,110B to scale process 200 to allow for processing of high volumes of heterogeneous datasets while addressing previously identified shortcomings of processing high volumes of data.

Lastly, at 214, data processing program 110A,110B automatically identifies clusters of similar datasets and generates distance graphs using the calculated overall distance metric that illustrate inferred lineage for the clusters of similar datasets. Data processing 110A,110B may generate distance graphs similar to the graphs shown in FIG. 3B. In each distance graph, each node 330 represents a table and each edge 340 connecting a pair of nodes has a length corresponding to the similarity between a given pair of tables. As shown in the left-most distance graph 350 of FIG. 3B, data processing program 110A,110B may generate a distance graph showing strongly connected clusters containing all related tables. There may be an edge (line) between each pair of nodes if their distance is below a threshold (t). The weight of the edge between a first node a, and a second node b may be dist(a,b). As shown in the middle graph of 360 of FIG. 3B, data processing program 110A,110B may then modify the graph to create a directed distance graph. In embodiments, data processing program 110A,110B may create the directed distance graph by assigning the direction of the edges by using creation timestamps for the tables. As such, each edge may illustrate direction from an older table to a newer table, indicating chronology of when modifications were made. In embodiments, if creation time is not available, data processing program 110A,110B may assign heuristic-based directions or two-edges in either direction may be added. Lastly, as shown in the right most graph 370 of FIG. 3B, data processing program may generate an inferred lineage graph. Data processing program 110A,110B may generate the inferred lineage graph by using Edmond's algorithm to discover the minimum weight arborescence (directed minimum spanning tree). This final graph depicts the inferred lineage among table copies.

Figure 3A:
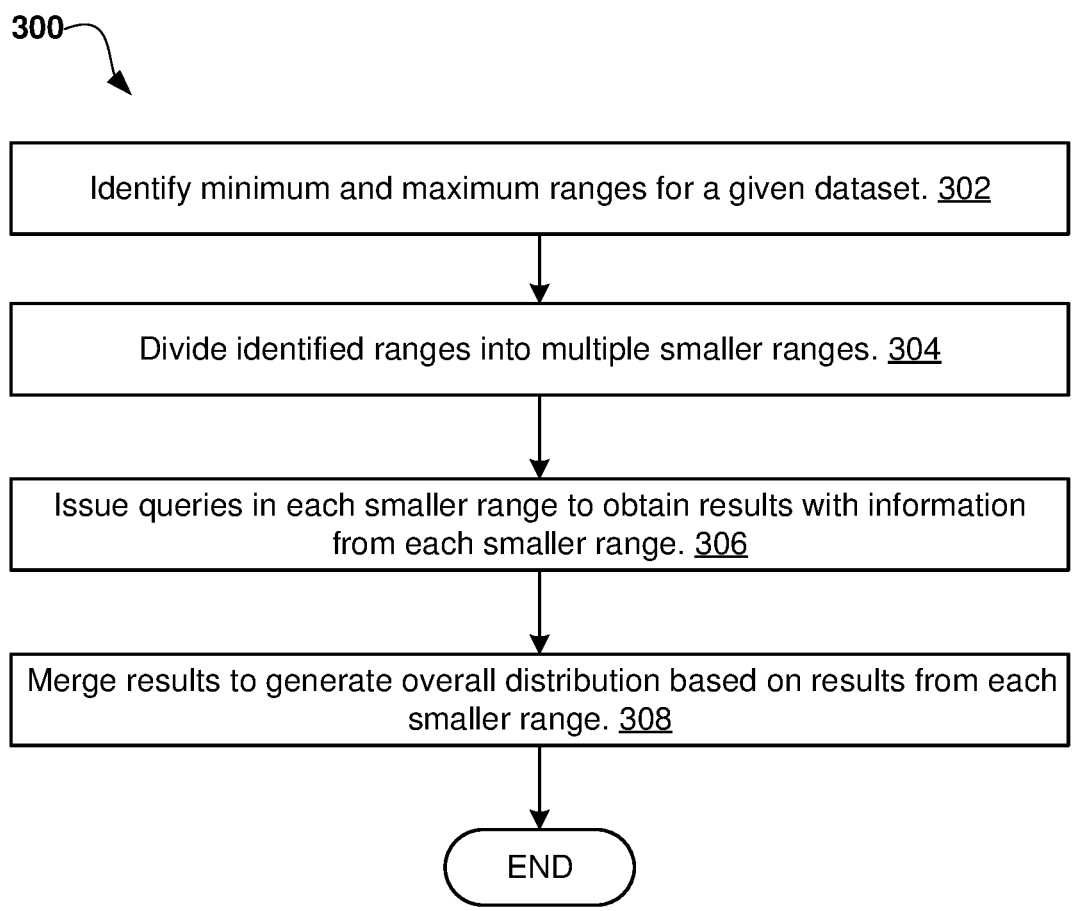
FIG. 3A illustrates an operational flowchart for carrying out high volume distribution generation according to at least one embodiment.
Figure 3B:
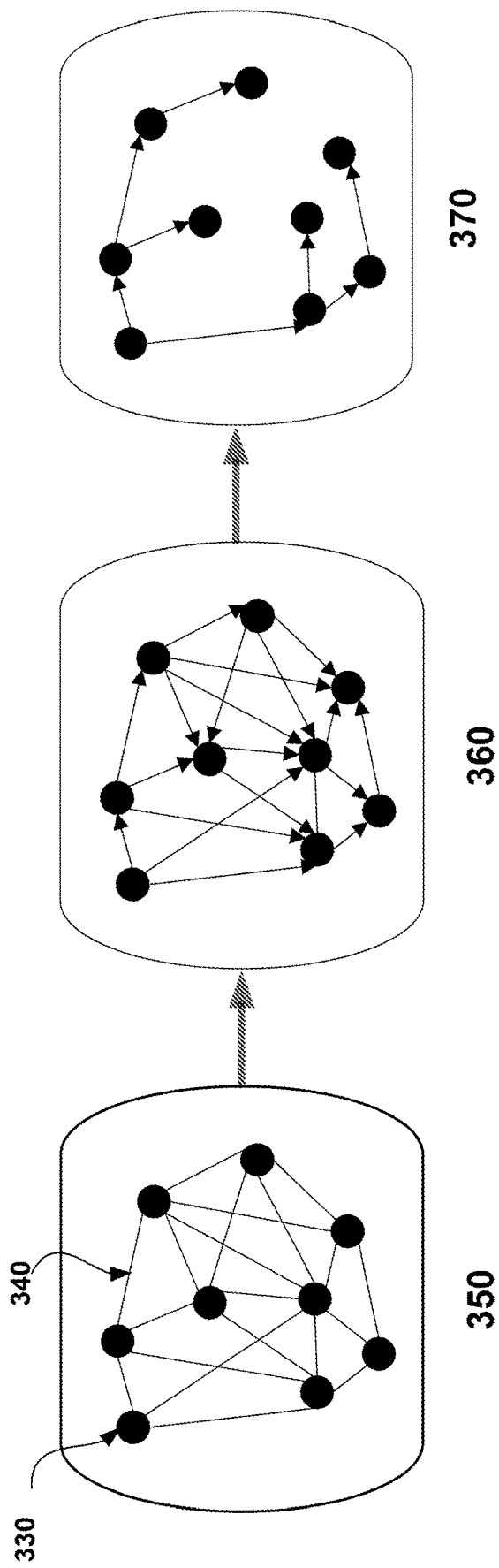
FIG. 3B illustrates a series of distance graphs generatable according to at least one embodiment.

It may be appreciated that FIGS. 2, 3A, and 3B provide only illustrations of an exemplary implementation and does not imply any limitations with regard to how different embodiments may be implemented. Many modifications to the depicted environments may be made based on design and implementation requirements.

Figure 4:
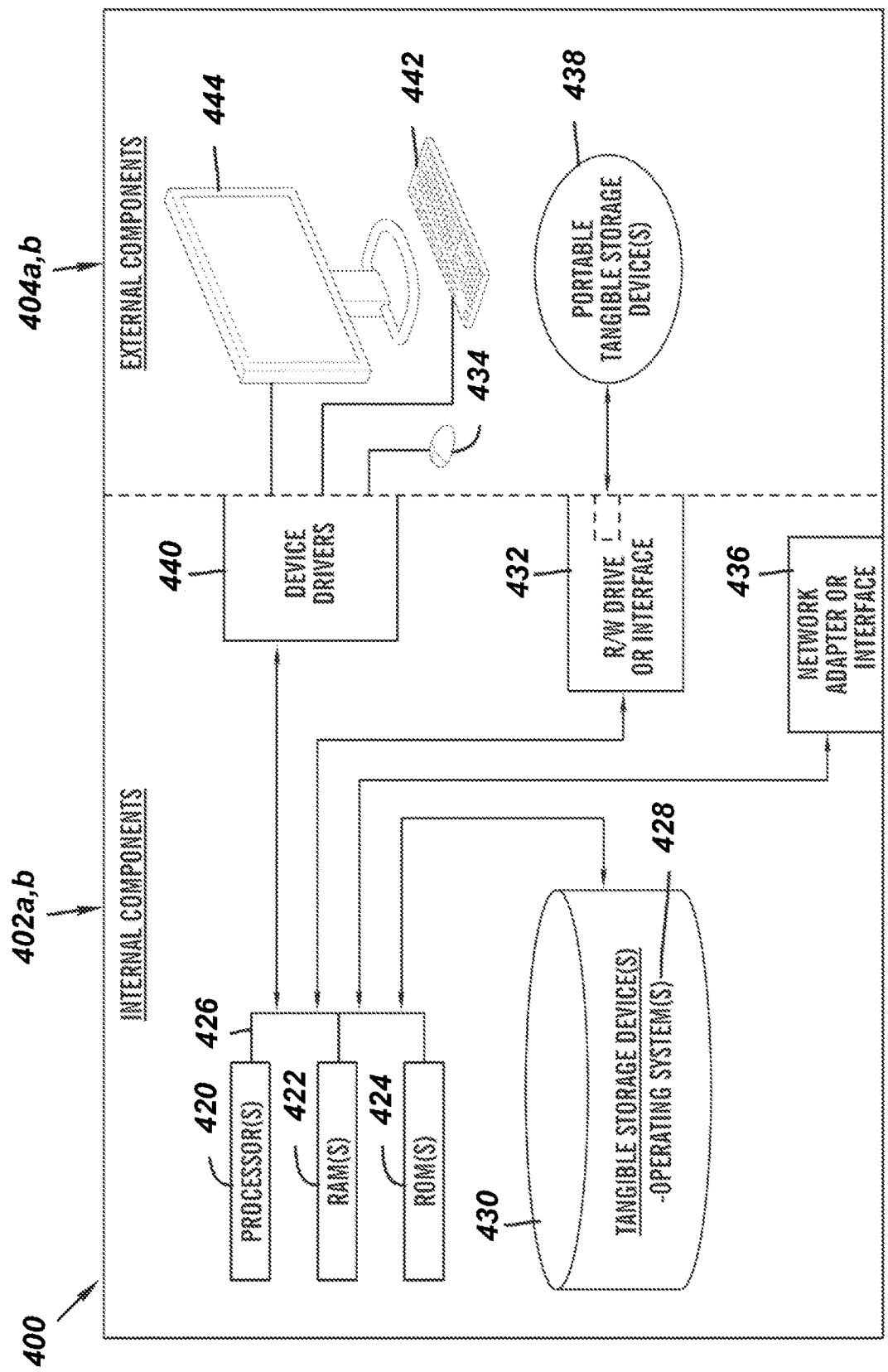
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the data processing program 110A in the client computing device 102 and the data processing program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the data processing program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the data processing program 110A in the client computing device 102 and the data processing program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the data processing program 110A in the client computing device 102 and the data processing program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 include hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
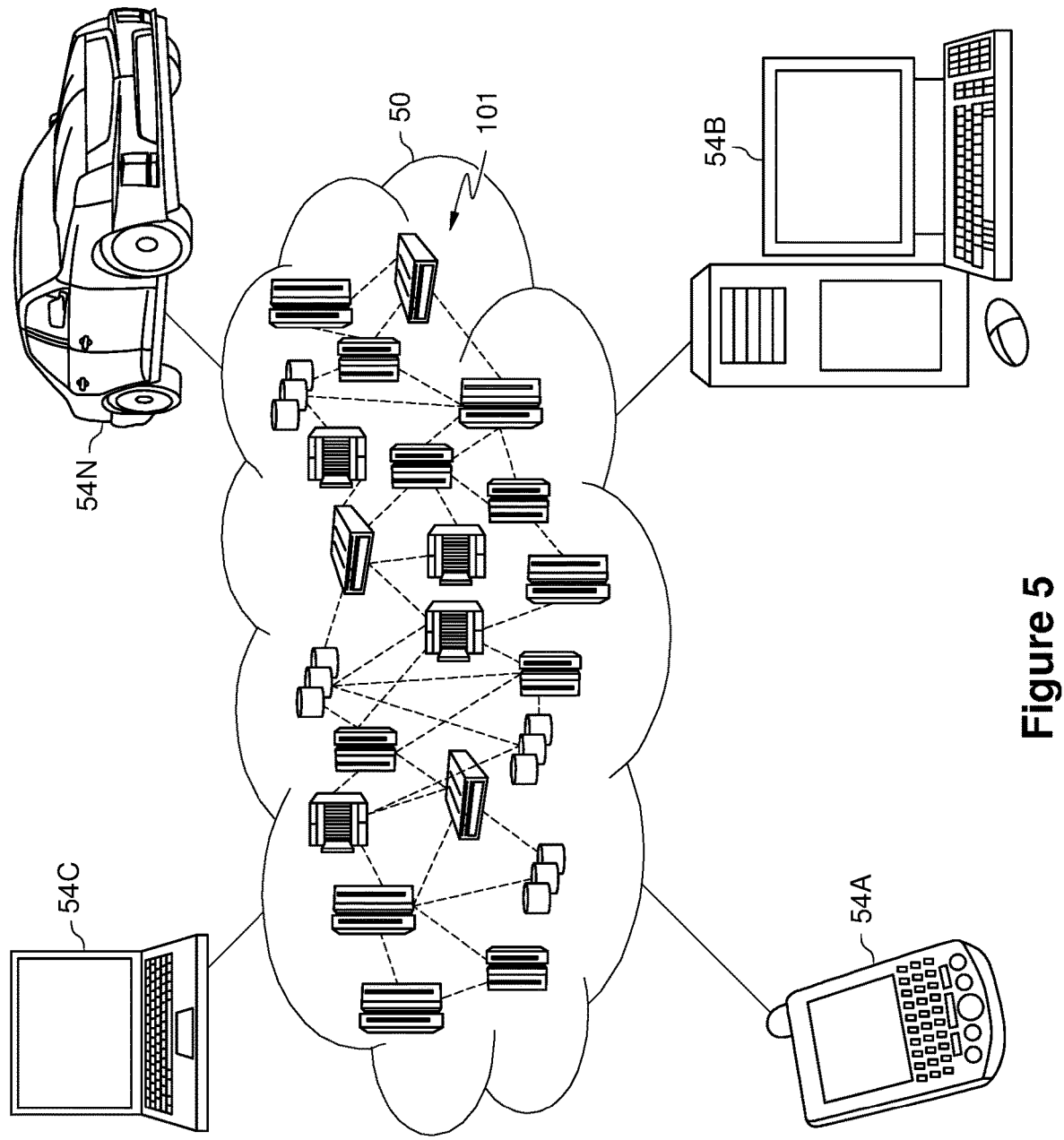
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 101 with which local computing devices used by cloud consumers, such as, for example, personal digital assistant (PDA) or cellular telephone 54A, desktop computer 54B, laptop computer 54C, and/or automobile computer system 54N may communicate. Nodes 101 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
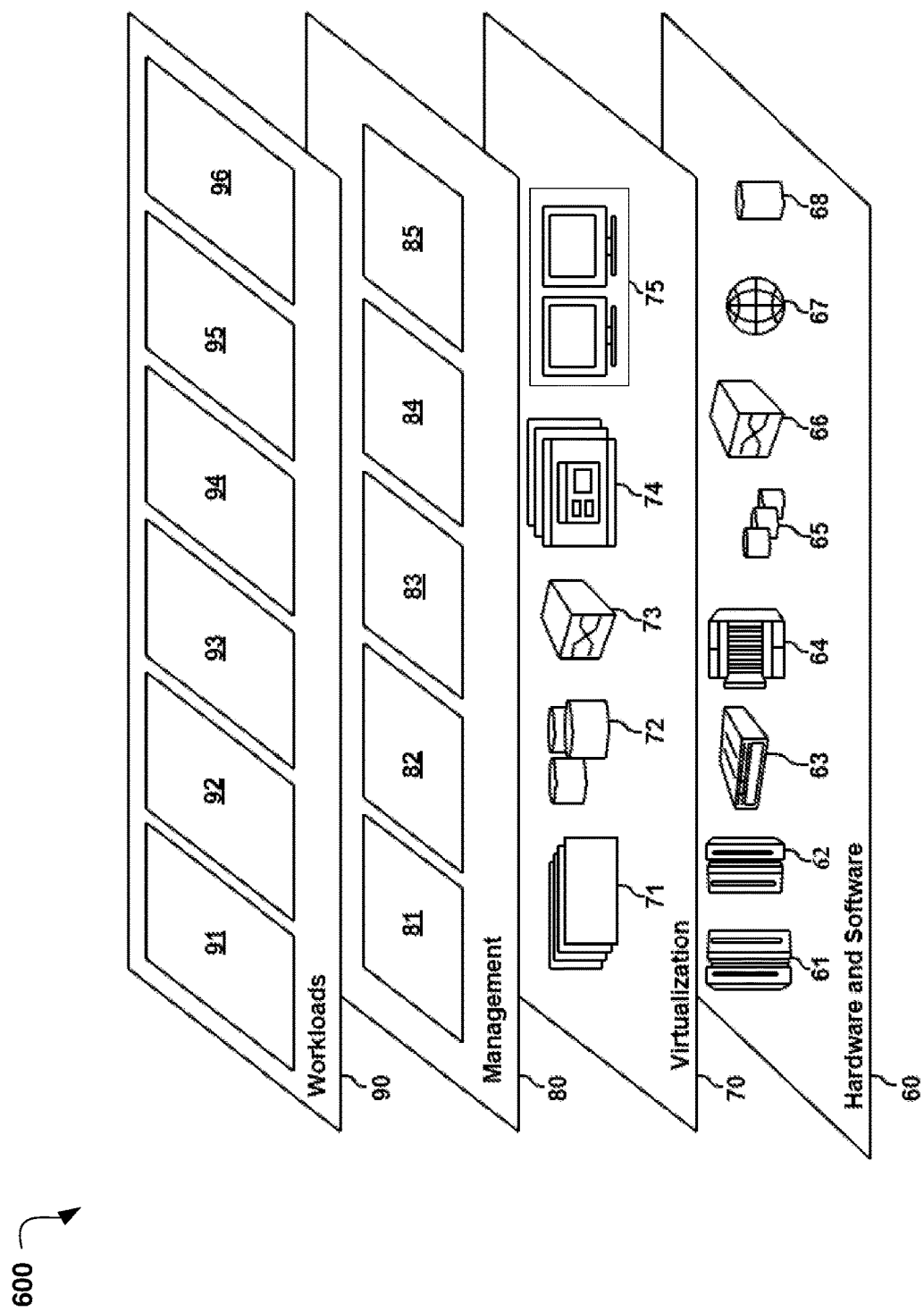
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying and sorting duplicate datasets within a large pool of heterogeneous datasets 96. Identifying and sorting duplicate datasets within a large pool of heterogeneous datasets 96 may relate to using both metadata and naming information, as well as data distribution information, to identify duplicate datasets present in a plurality of heterogeneous datasets and generate inferred lineage data that a user may use to more easily manage or sort the datasets.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of identifying and sorting similar datasets stored within a pool of heterogeneous datasets, the method comprising:
   receiving a plurality of heterogeneous datasets;
   automatically comparing schema information and metadata within each of the received plurality of heterogeneous datasets to generate name-based similarity scores for each combination of datasets;
   automatically pruning the plurality of heterogeneous datasets by removing datasets having no similarities;

automatically identifying clusters of similar datasets using the name-based similarity scores for each dataset and generating mapping graphs illustrating each cluster of similar datasets;

automatically comparing data distribution information within each of the received plurality of heterogeneous datasets to generate a plurality of data distribution similarity scores for each heterogeneous dataset;

automatically calculating an overall distance metric using the name-based similarity scores and plurality of data distribution similarity scores; and based on the calculated overall distance metric, automatically generating distance graphs, wherein the automatically generated distance graphs identify clusters of similar datasets and illustrate inferred lineage for the clusters of similar datasets.

2. The computer-based method of claim 1, further comprising:

identifying minimum and maximum ranges for each heterogeneous dataset associated with the plurality of datasets and dividing the identified ranges into a plurality of smaller ranges.

3. The computer-based method of claim 2, further comprising:

issuing queries in each smaller range associated with the plurality of smaller ranges to obtain results from each smaller range, and merging the results from each smaller range to generate overall distributions.

4. The computer-based method of claim 1, wherein the data distribution information comprises at least one of numerical, categorical, text, or date information.

5. The computer-based method of claim 1, wherein automatically calculating an overall distance metric using the name-based similarity scores and plurality of data distribution similarity scores further comprises:

automatically applying a predetermined weight multiplier to each of the plurality of name-based and data distribution similarity scores.

6. The computer-based method of claim 1, wherein automatically comparing schema information and metadata within each of the received plurality of heterogeneous datasets to generate name-based similarity scores for each dataset further comprises:

comparing a plurality of tokens from one or more tables and determining similarities between the plurality of tokens based on one or more of semantic relatedness, abbreviations, prefix matching, and acronym comparison.

7. The computer-based method of claim 1, wherein based on the calculate overall distance metric, automatically generating distance graphs that identify clusters of similar datasets and illustrate inferred lineage for the clusters of similar datasets further comprises:

assigning a direction for each edge in the distance graphs by using timestamps for each represented table or by using heuristic-based directions, and then applying Edmond's algorithm to determine the minimum weight arborescence for the clusters of similar datasets in the distance graph.

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving a plurality of heterogeneous datasets;

automatically comparing schema information and metadata within each of the received plurality of heterogeneous datasets to generate name-based similarity scores for each combination of datasets;

automatically pruning the plurality of heterogeneous datasets by removing datasets having no similarities;

automatically identifying clusters of similar datasets using the name-based similarity scores for each dataset and generating mapping graphs illustrating each cluster of similar datasets;

automatically comparing data distribution information within each of the received plurality of heterogeneous datasets to generate a plurality of data distribution similarity scores for each heterogeneous dataset;

automatically calculating an overall distance metric using the name-based similarity scores and plurality of data distribution similarity scores; and based on the calculated overall distance metric, automatically generating distance graphs, wherein the automatically generated distance graphs identify clusters of similar datasets and illustrate inferred lineage for the clusters of similar datasets.

9. The computer system of claim 8, further comprising:

identifying minimum and maximum ranges for each heterogeneous dataset associated with the plurality of datasets and dividing the identified ranges into a plurality smaller ranges.

10. The computer system of claim 9, further comprising:

issuing queries in each smaller range associated with the plurality of smaller ranges to obtain results from each smaller range and merging the results from each smaller range to generate overall distributions.

11. The computer system of claim 8, wherein the data distribution information comprises at least one of numerical, categorical, text, or date information.

12. The computer system of claim 8, wherein automatically calculating an overall distance metric using the name-based similarity scores and plurality of data distribution similarity scores further comprises:

automatically applying a predetermined weight multiplier to each of the plurality of name-based and data distribution similarity scores.

13. The computer system of claim 8, wherein automatically comparing schema information and metadata within each of the received plurality of heterogeneous datasets to generate name-based similarity scores for each dataset further comprises:

comparing a plurality of tokens from one or more tables and determining similarities between the plurality of tokens based on one or more of semantic relatedness, abbreviations, prefix matching, and acronym comparison.

14. The computer system of claim 8, wherein based on the calculate overall distance metric, automatically generating distance graphs that identify clusters of similar datasets and illustrate inferred lineage for the clusters of similar datasets further comprises:

assigning a direction for each edge in the distance graphs by using timestamps for each represented table or by using heuristic-based directions, and then applying Edmond's algorithm to determine the minimum weight arborescence for the clusters of similar datasets in the distance graph.

15. A computer program product, the computer program product comprising:
  one or more computer-readable tangible storage medium and program instructions stored on at least one of the one or more computer-readable tangible storage medium, the program instructions executable by a processor capable of performing a method, the method comprising:
  receiving a plurality of heterogeneous datasets;
  automatically comparing schema information and metadata within each of the received plurality of heterogeneous datasets to generate name-based similarity scores for each combination of datasets;
  automatically pruning the plurality of heterogeneous datasets by removing datasets having no similarities;
  automatically identifying clusters of similar datasets using the name-based similarity scores for each dataset and generating mapping graphs illustrating each cluster of similar datasets;
  automatically comparing data distribution information within each of the received plurality of heterogeneous datasets to generate a plurality of data distribution similarity scores for each heterogeneous dataset;
  automatically calculating an overall distance metric using the name-based similarity scores and plurality of data distribution similarity scores; and
  based on the calculated overall distance metric, automatically generating distance graphs, wherein the automatically generated distance graphs identify clusters of similar datasets and illustrate inferred lineage for the clusters of similar datasets.

16. The computer program product of claim 15, further comprising:
  identifying minimum and maximum ranges for each heterogeneous associated with the plurality of datasets dataset and dividing the identified ranges into a plurality of smaller ranges.

17. The computer program product of claim 16, further comprising:
  issuing queries in each smaller range associated with the plurality of smaller ranges to obtain results from each smaller range, and merging the results from each smaller range to generate overall distributions.

18. The computer program product of claim 15, wherein the data distribution information comprises at least one of numerical, categorical, text, or date information.

19. The computer program product of claim 15, wherein automatically calculating an overall distance metric using the name-based similarity scores and plurality of data distribution similarity scores further comprises:
  automatically applying a predetermined weight multiplier to each of the plurality of name-based and data distribution similarity scores.

20. The computer program product of claim 15, wherein automatically comparing schema information and metadata within each of the received plurality of heterogeneous datasets to generate name-based similarity scores for each dataset further comprises:
  comparing a plurality of tokens from one or more tables and determining similarities between the plurality of tokens based on one or more of semantic relatedness, abbreviations, prefix matching, and acronym comparison.

* * * * *